(12) United States Patent
Kim et al.

(10) Patent No.: US 7,871,530 B2
(45) Date of Patent: Jan. 18, 2011

(54) NEAR-FIELD OPTICAL PROBE BASED ON SOI SUBSTRATE AND FABRICATION METHOD THEREOF

(75) Inventors: Eunkyoung Kim, Daejeon (KR); Sung Q Lee, Daejeon (KR); Kang Ho Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/465,765

(22) Filed: May 14, 2009

(65) Prior Publication Data

US 2009/0218648 A1   Sep. 3, 2009

Related U.S. Application Data

(62) Division of application No. 11/633,820, filed on Dec. 5, 2006, now Pat. No. 7,550,311.

(30) Foreign Application Priority Data

Dec. 7, 2005   (KR) .................. 10-2005-0118779
Sep. 6, 2006   (KR) .................. 10-2006-0085823

(51) Int. Cl.
*H01L 21/306*   (2006.01)

(52) U.S. Cl. ................. 216/11; 216/24; 216/41; 216/57; 250/306; 250/307; 250/324; 250/216; 173/105; 257/E21.53; 257/E21.223; 257/E21.252; 257/E23.078; 257/E27.006; 438/50; 438/52; 438/53; 438/66; 438/702; 977/873; 977/875; 977/878

(58) Field of Classification Search .............. 216/24, 216/41, 57; 250/306, 307, 324; 173/105; 257/E21.53, E21.223, E21.252, E23.078, 257/E27.006; 977/873, 875, 878
See application file for complete search history.

(56) References Cited

U.S. PATENT DOCUMENTS 5,202,281 A   4/1993 Ishibashi (Continued)

FOREIGN PATENT DOCUMENTS

KR   1020040035497 A   4/2004

(Continued)

OTHER PUBLICATIONS

Ki-Bong Song, et al; "Fabrication of a High-Throughput Cantilever-Style Aperture Tip by the Use of the Bird's-Beak Effect", ©2003 The Japan Society of Applied Physics, Jpn. J. Appl. Phys., vol. 42, pp. 4353-4356.

(Continued)

*Primary Examiner*—Dao H Nguyen
(74) *Attorney, Agent, or Firm*—Ladas & Parry LLP (57) ABSTRACT

Provided is near-field optical probe including: a cantilever arm support portion that is formed of a lower silicon layer of a silicon-on-insulator (SOI) substrate, the cantilever arm support portion having a through hole formed therein at a side of the lower silicon layer; and a cantilever arm forming of a junction oxidation layer pattern and an upper silicon layer pattern on the SOI substrate that are supported on an upper surface of the lower silicon layer and each have a smaller hole than the through hole, a silicon oxidation layer pattern having a tip including an aperture at a vertical end, corresponding with the hole on the upper silicon layer pattern, and an optical transmission prevention layer that is formed on the silicon oxidation layer pattern and does not cover the aperture.

3 Claims, 6 Drawing Sheets

U.S. PATENT DOCUMENTS 5,666,190 A    9/1997   Quate et al.
7,393,713 B2 * 7/2008   Kim et al. .................... 438/52

FOREIGN PATENT DOCUMENTS

KR    1020050102158 A    10/2005

OTHER PUBLICATIONS

P. Grabiec, et al; "SNOM/AFM microphone integrated with piezoresistive cantilever beam for multifunctional surface analysis" ©2002 Microelectronic Engineering 61-62, pp. 981-986.

* cited by examiner

NEAR-FIELD OPTICAL PROBE BASED ON SOI SUBSTRATE AND FABRICATION METHOD THEREOF

CROSS-REFERENCE TO RELATED PATENT APPLICATION

This application claims the benefit of Korean Patent Application Nos. 10-2005-0118779 and 10-2006-0085823, filed on Dec. 7, 2005 and Sep. 6, 2006, respectively, in the Korean Intellectual Property Office, the disclosures of which are incorporated herein in their entirety by reference.

BACKGROUND OF THE INVENTION

1. Field of the Invention

The present invention relates to a near-field optical probe and a method of manufacturing the same, and more particularly, to a near-field optical probe that can be applied to a near-field scanning optical microscope or a near-field optical data storage device and a method of manufacturing the near-field optical probe.

2. Description of the Related Art

A near-field scanning optical microscope examines optical characteristics of a sample with an optical resolution that is finer than the diffraction limit of an incident light. Two types of the near-field optical probes, a fiber type and a cantilever type probes are used for the near-field scanning optical microscope. A near-field optical data storage device has the advantage of high-density data storage. The size of an optical recording mark can be reduced to less than the diffraction limit of a recording light using a near-field optical probe.

Near-field optical probes that are used in the near-field scanning optical microscope or in the near-field optical data storage device can be classified into a silicon based cantilever type near-field optical probe, a silicon based slider type near-field optical probe, or an optical fiber type near-field optical probe. The near-field optical probes manufactured on a silicon substrate are mechanically more stable and suitable for mass-production.

The method of manufacturing a near-field optical probe using a silicon substrate uses manufacturing processes partially in common with a conventional method of manufacturing optical probes for atomic force microscope. However, the significant difference of the method of manufacturing near-field optical probe using the silicon substrate is that an aperture in a tip is formed so that the near field of the light can be generated at the apex of the tip. The method of manufacturing a near-field optical probe is more difficult and complicated than the method of manufacturing optical probes for an atomic force microscope.

In particular, when a silicon substrate is used, it is technically difficult to combine a manufacturing process of tips having an aperture with a manufacturing process of a cantilever arm including the tips. Also, when a silicon substrate is used, it is difficult to substantially control the size of the aperture at an end of the tips which are in the nanometer region.

SUMMARY OF THE INVENTION

The present invention provides a near-field optical probe that is manufactured based on a silicon-on-insulator (SOI) substrate and not using a single silicon substrate.

The present invention also provides a method of manufacturing a near-field optical probe that can easily combine a manufacturing process of tips having an aperture and a manufacturing process of a cantilever arm including the tips using an SOI substrate.

According to an aspect of the present invention, the near-field optical probe includes a cantilever arm support portion formed of a lower silicon layer of a silicon-on-insulator (SOI) substrate, the cantilever arm support portion having a through hole formed therein at a side of the lower silicon layer. The near-field optical probe also includes a cantilever arm formed of a junction oxidation layer pattern and an upper silicon layer pattern on the SOI substrate that are supported on an upper surface of the lower silicon layer and each have a smaller hole than the through hole, a silicon oxidation layer pattern having a tip including an aperture at a vertical end corresponding with the hole on the upper silicon layer pattern, and an optical transmission prevention layer that is formed on the silicon oxidation layer pattern and does not cover the aperture. The tip may be comprised of a conical form or in a parabolic form. The aperture may be comprised of protrudes upward from the SOI substrate.

According to another aspect of the present invention, a method of manufacturing a near-field optical probe includes forming a junction oxidation layer pattern having a first hole on a lower silicon layer and forming a SOI substrate by forming an upper silicon layer on the junction oxidation layer pattern which includes the first hole. A tip structure is formed on the upper silicon layer formed over the first hole. A silicon oxidation layer pattern and an upper silicon layer pattern that form a cantilever arm are sequentially formed on the outer surface of the tip structure and the upper silicon layer. An etching mask layer pattern is formed on a rear surface of the lower silicon layer for forming a cantilever arm support portion. A through hole exposing the junction oxidation layer pattern and a tip having an aperture above a second hole that is smaller than the through hole are formed by etching the lower silicon layer and the upper silicon layer pattern in the tip structure on the first hole using the etching mask layer pattern as an etching mask. Also, an optical transmission prevention layer is formed on the silicon oxidation layer pattern that does not cover the aperture.

Thus, the cantilever arm is formed of the upper silicon layer pattern and the junction oxidation layer pattern that are supported on an upper surface of the lower silicon layer and each have the second hole that is smaller than the through hole, of the silicon oxidation layer pattern including the tip having the aperture corresponding to the second hole, and of the optical transmission prevention layer.

The tip structure may be formed such that a silicon nitride layer pattern is formed on a portion of the upper silicon layer, and the upper silicon layer is wet-etched using the silicon nitride layer pattern as a mask to be formed in a conical form or in a parabolic form. The silicon oxidation layer pattern and the upper silicon layer pattern forming the cantilever arm are formed by forming a silicon oxidation layer on the outer surface of the tip structure and on the upper silicon layer by oxidizing the upper silicon layer having the tip structure and by patterning the silicon oxidation layer and the upper silicon layer.

The through hole, the second hole, and the tip may be formed by forming a through hole exposing the junction oxidation layer pattern by etching the lower silicon layer using the etching mask layer pattern as an etching mask and etching the upper silicon layer pattern in the tip structure on the first hole using the junction oxidation layer pattern as an etching mask.

As described above, the near-field optical probe according to the present invention is formed such that the tips of the near-field optical probe are formed to protrude sharply from the SOI substrate. Also, according to the present invention, the manufacturing process of tips having an aperture and a manufacturing process of a cantilever arm including the tips can be easily combined.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity.

First, a structure of a near-field optical probe according to an embodiment of the present invention will be described with reference to FIGS. 14 and 15.

Figure 14:
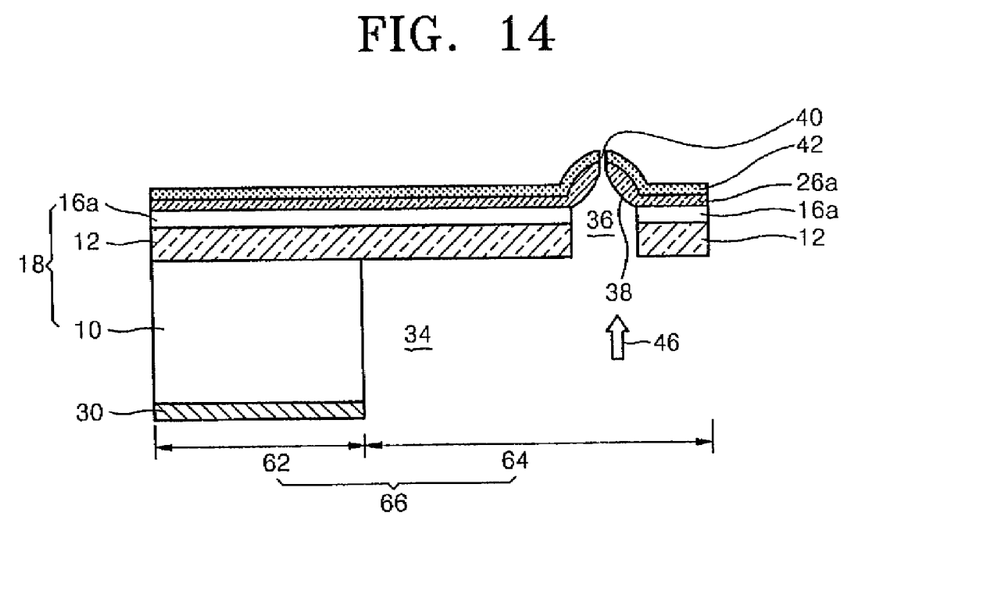
Figure 15:
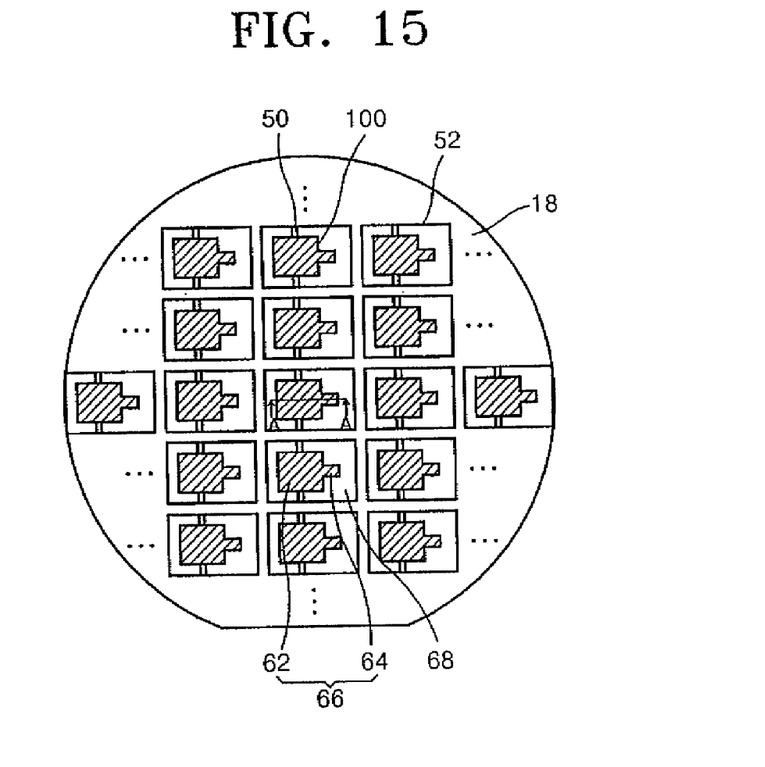
FIG. 15 is plane view of a near-field optical probe according to an embodiment of the present invention.

FIG. 14 is a cross-sectional view illustrating the near-field optical probe according to an embodiment of the present invention, and FIG. 15 is a plane view of the near-field optical probe. In addition, FIG. 14 is a cross-sectional view of the near-field optical probe cut along a line A-A of FIG. 15.

Referring to FIG. 14, a plurality of near-field optical probes 100 are formed in a plurality of regions 52 of a silicon-on-insulator (SOI) substrate 18 that is formed of a lower silicon layer 10, a junction oxidation layer pattern 12, and an upper silicon layer pattern 16a. The near-field optical probes 100 formed inside the divided regions 52 are connected to a silicon layer 50 (lower or upper silicon layer) constituting the SOI substrate 18. An individual near-field optical probe 100 is provided by cutting the silicon layer 50 using a diamond saw or a cutting means.

The near-field optical probe 100 may include a cantilever portion 66 formed of a cantilever arm support portion 62 and a cantilever arm 64 supported by the cantilever arm support portion 62, and reference numeral 68 denotes an isolation portion in which the SOI substrate 18 thereof is removed.

Referring to FIG. 14, the near-field optical probe 100 is broadly divided into a cantilever arm support portion 62 formed of a lower silicon layer 10 of the SOI substrate 18 and having a through hole 34 at a side of the lower silicon layer 10, and a cantilever arm 64 which is supported by the cantilever arm support portion 62 and is positioned corresponding to the through hole 34. The cantilever arm 64 includes a tip 38 and an aperture 40 arranged corresponding to the through hole 34. The cantilever arm 64 is supported on an upper surface of the lower silicon layer 10 of the SOI substrate constituting the cantilever arm support portion 62.

In detail, the cantilever arm 64 is formed of a junction oxidation layer pattern 12 and an upper silicon layer pattern 16a of the SOI substrate 18 that are supported on an upper surface of the lower silicon layer 10 of the SOI substrate 18 constituting the cantilever arm support portion 62 and have a hole 36 that is smaller than the through hole 34, a silicon oxidation layer pattern 26a including a tip having an aperture 40 at a vertical end of the tip corresponding to the hole 36 on the upper silicon layer pattern 16a, and a optical transmission prevention layer 42 that is formed on the silicon oxidation layer pattern 26a and does not cover the aperture 40. The tip 38 is formed in a conical form or in a parabolic form. The tip 38 is formed in a conical form or in a parabolic form to improve the optical transmission ratio. The optical transmission prevention layer 42 is a metal layer.

In the near-field optical probe in the current embodiment of the present invention, light proceeds upward from the lower side (bottom) as denoted with a reference numeral 46, and the tip 38 is disposed to point upward, that is, in an upward direction. Thus, when the tip 38 is directed upward, the tip 38 can be prevented from colliding with the sample to be measured. Moreover, as will be described below, a manufacturing process of a tip having an aperture and a manufacturing process of a cantilever including the tip as described above can be easily combined according to an embodiment of the present invention.

Hereinafter, a method of manufacturing a near-field optical probe according to an embodiment of the present invention will be described.

FIGS. 1 through 14 are cross-sectional views illustrating the method of manufacturing a near-field optical probe according to an embodiment of the present invention. FIGS. 1 through 14 are cross-sectional views of the near-field optical probe cut along a line A-A of FIG. 15. FIGS. 1 through 14 illustrate a method of manufacturing one of the near-field optical probes 100 that are formed on the SOI substrate 18 of FIG. 15. FIGS. 1 through 14 illustrate forming one tip 38 on one near-field optical probe 100. However, a plurality of tips may also be formed on one near-field optical probe 100.

Figure 1:
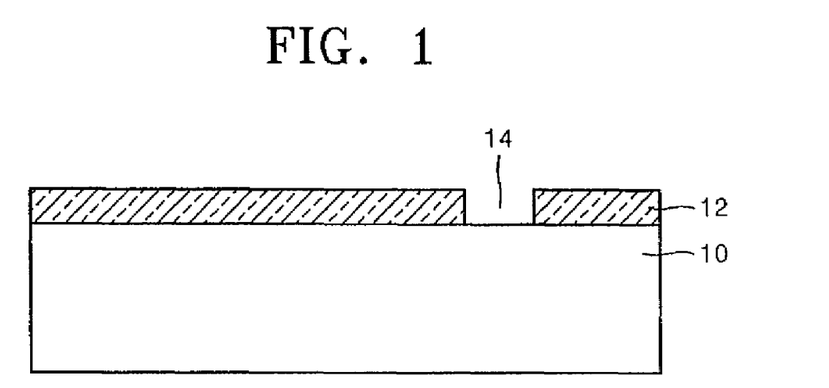
FIGS. 1 through 14 are cross-sectional views illustrating a near-field optical probe and a method of manufacturing the near-field optical probe according to an embodiment of the present invention.
Figure 2:
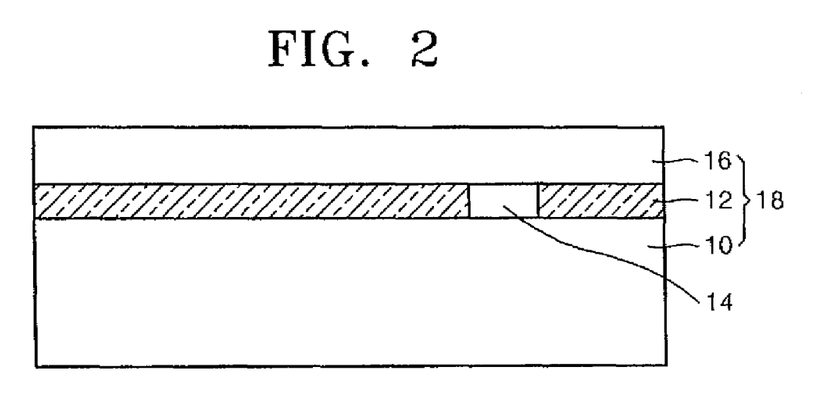

Referring to FIGS. 1 and 2, a junction oxidation layer pattern 12. having a first hole 14 is formed on a lower silicon layer 10. The first hole 14 is formed in advance for forming a tip of a near-field optical probe in a later process. The first hole 14 is formed by forming a junction oxidation layer to a thickness of 0.5 to 2 μm using a thermal oxidation deposition method on the lower silicon layer 10 having a thickness of 200 to 600 μm, and then etching using a photographic etching process and patterning the junction oxidation layer.

Next, an upper silicon layer 16 having a thickness of 7 through 20 μm is joined on the first hole 14 and the junction oxidation layer pattern 12. Accordingly, formation of the SOI substrate 18, which is formed of the lower silicon layer 10, the junction oxidation layer pattern 12 having the first hole 14, and the upper silicon layer 16, is complete. FIGS. 1 and 2 illustrate a process of forming a first hole 14 which is necessary for facilitating formation of a tip on the junction oxidation layer in a post-process.

Figure 3:
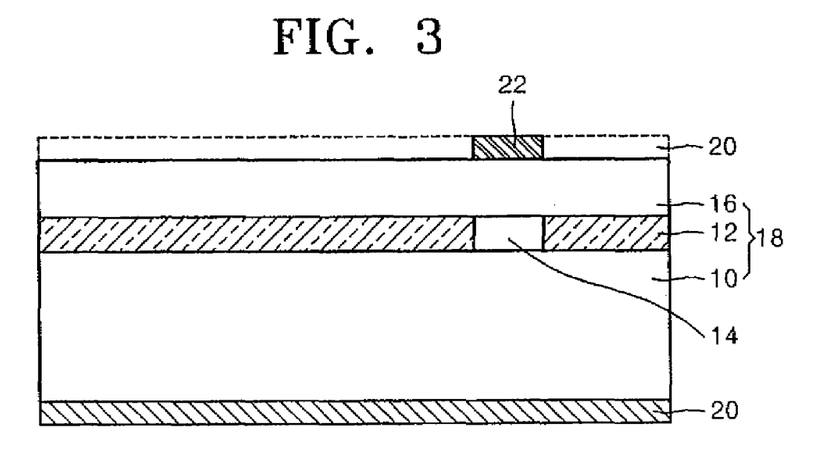

Referring to FIG. 3, a first silicon nitride layer 20 is formed to a thickness of 200 to 300 nm on the upper silicon layer 16 and the lower silicon layer 10 of the SOI substrate 18. In other words, the first silicon nitride layer 20 is formed on a upper surface and a lower surface of the SOI substrate 18.

Next, a silicon nitride layer pattern 22 is formed by patterning the first silicon nitride layer 20 formed on the upper silicon layer 16 of the SOI substrate 18 using a photographic etching process and etching using a dry etching method. The silicon nitride layer pattern 22 functions as an etching mask layer in the post-process. The silicon nitride layer pattern 22 is formed to be aligned over the first hole 14 to form a tip in the post-process.

Figure 4:
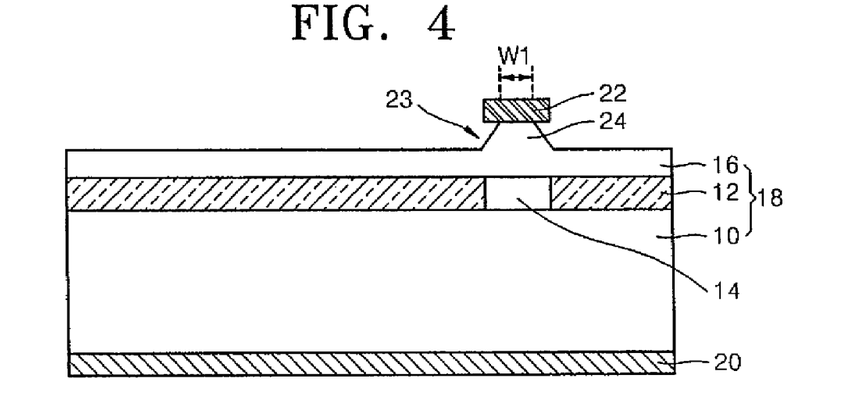

Referring to FIG. 4, the upper silicon layer 16 of the SOI substrate 18 is isotropically etched using the silicon nitride layer pattern 22 to form a tip structure 24 in a conical form. The upper silicon layer 16 is etched isotropically by means of a wet etching method using a mixed solution of fluoric acid, nitric acid, and acetic acid or by means of a dry etching method using a reactive ion etch (RIE) apparatus in an SF6 gas atmosphere. In FIG. 4, when the upper silicon layer 16 forming the SOI substrate 18 is isotropically etched, an undercut 23 is created under the silicon nitride layer pattern 22.

Accordingly, during isotropic etching, a width W1 of the junction surface of the silicon nitride layer pattern 22 and the upper silicon layer 16 is adjusted to be less than a micrometer, thereby forming a tip structure 24 in a conical form. In particular, when the etching time or etching conditions of the upper silicon layer 16 forming the SOI substrate 18 are controlled, the tip structure 24 can be easily formed in a conical form or in a parabolic form.

Figure 5:
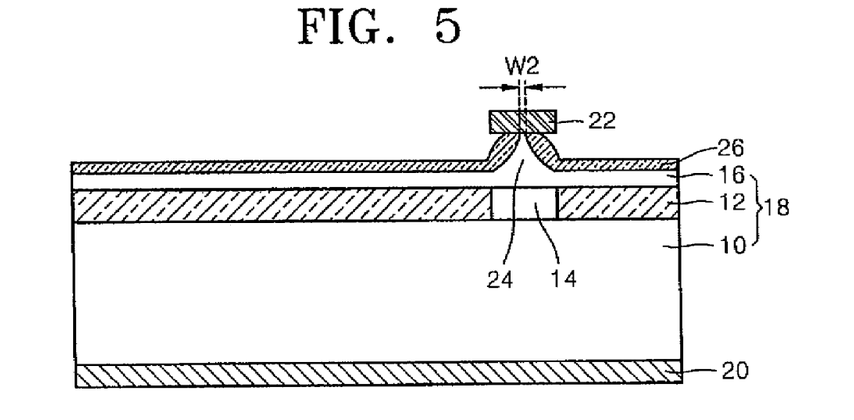

Referring to FIG. 5, a silicon oxidation layer 26 is formed to a thickness of 500 to 800 nm by oxidizing the upper silicon layer 16 of the SOI substrate 18 including the tip structure 24. In other words, a silicon oxidation layer 26 is formed on the outer surface of the tip structure 24 and on the upper silicon layer 16. Accordingly, the silicon oxidation layer 26 is formed on the outer surface of the tip structure 24 in a parabolic form or in a conical form.

In particular, when the silicon oxidation layer 26 is formed by oxidizing the upper silicon layer 16 of the SOI substrate 18, a width W2 of the upper silicon layer 16 contacting the silicon nitride layer pattern 22 is formed to be 100 nm or less, preferably 10 to 100 nm. A portion of the upper silicon layer 16 contacting the silicon nitride layer pattern 22 will be a hole where a tip of the near-field optical probe is formed, and thus the width W2 of the upper silicon layer 16 will influence the resolution power of the near-field scanning optical microscope or the storage density of the near-field optical data storage device.

Figure 6:
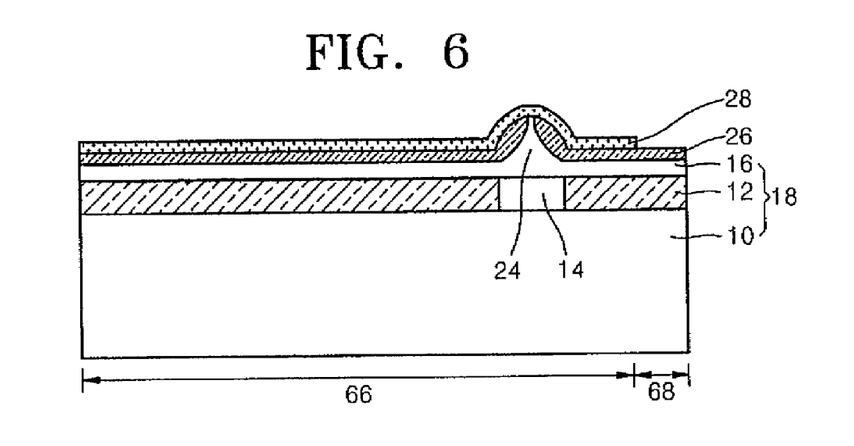

Referring to FIG. 6, the silicon nitride layer 20 formed on the lower surface of the SOI substrate 18 and the silicon nitride layer pattern 22 formed on the upper surface of the SOI substrate 18 are removed by means of a wet etching method using a phosphoric acid solution. A mask pattern 28 for forming a cantilever is formed on the silicon oxidation layer 26. The mask pattern 28 for forming a cantilever is formed as a photoresist pattern using a photographic process. The mask pattern 28 for forming a cantilever is formed only in a cantilever portion 66 of the SOI substrate 18. The remainder of the SOI substrate 18, excluding the cantilever portion 66, becomes the isolation portion 68.

Figure 7:
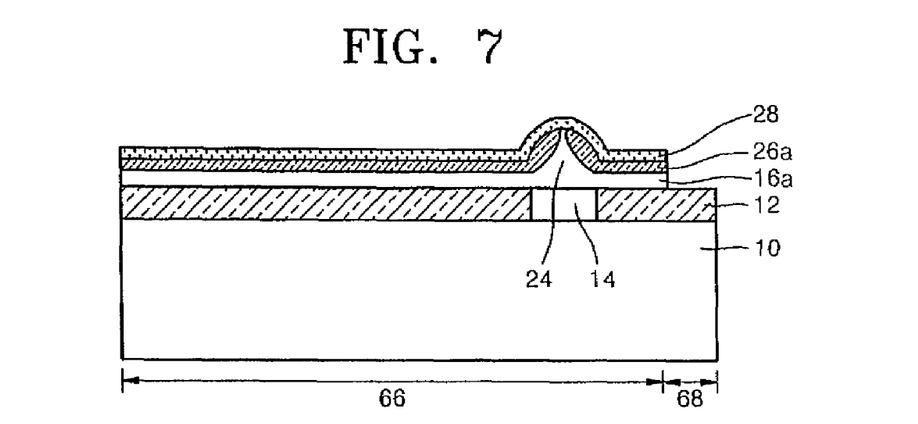

Referring to FIG. 7, a silicon oxidation layer pattern 26a and an upper silicon layer pattern 16a forming a cantilever arm 64 are formed by etching the silicon oxidation layer 26 and the upper silicon layer 16 using the mask pattern 28 for forming a cantilever. The silicon oxidation layer pattern 26a and the upper silicon layer pattern 16a form the cantilever arm 64.

Figure 8:
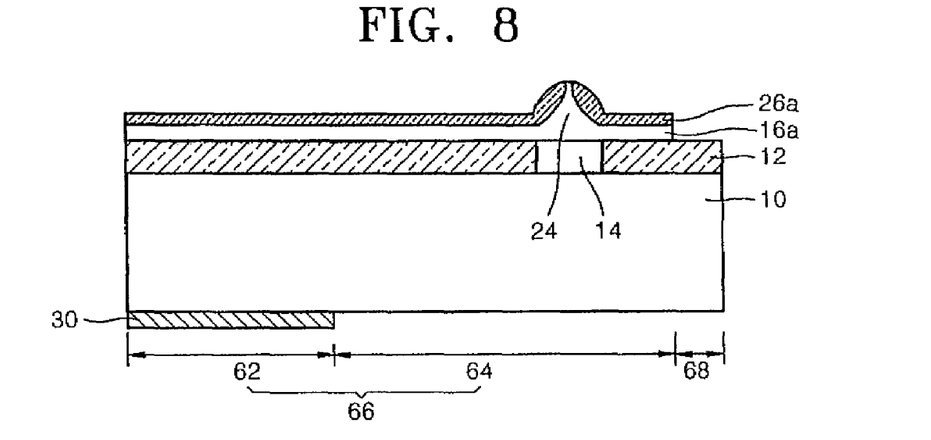

Referring to FIG. 8, after the mask pattern 28 for forming a cantilever is removed, an etching mask layer pattern 30 is formed on the lower surface of the SOI substrate 18, that is, on the lower surface of the lower silicon layer 10. The etching mask layer pattern 30 is a silicon oxidation layer pattern. The etching mask layer pattern 30 is formed by forming a silicon oxidation layer to a thickness of 2 to 4 μm on the portion of the lower surface of the lower silicon layer 10 that does not correspond to the tip structure 24 and then patterning the silicon oxidation layer using a photographic etching process. The etching mask layer pattern 30 is formed using a photograph process and an etching process using a double-sided exposure apparatus.

In particular, the portion of the resultant structure corresponding to the etching mask layer pattern 30 will be the cantilever arm supporting portion 62 supporting the cantilever arm 64 in the post-process. The remaining portion of the resultant structure excluding the cantilever arm supporting portion 62 of the cantilever portion 66 will include a tip and an aperture to form the cantilever arm 64.

Figure 9:
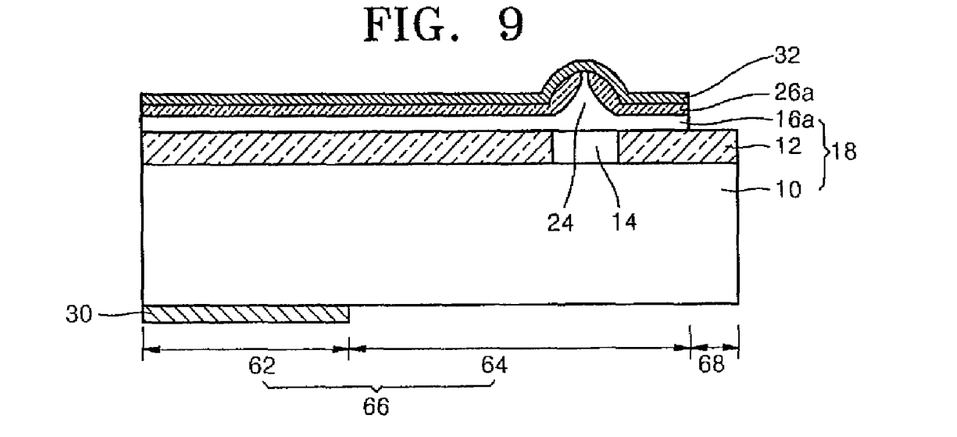

Referring to FIG. 9, a pattern 32 for protecting the cantilever arm 64 is formed on the silicon oxidation layer pattern 26a. The pattern 32 for protecting the cantilever arm is formed by forming a photoresist layer (not shown) on an upper surface of the SOI substrate 18 on which the upper silicon layer pattern 16a and the silicon oxidation layer pattern 26a are formed and patterning the photoresist layer.

Figure 10:
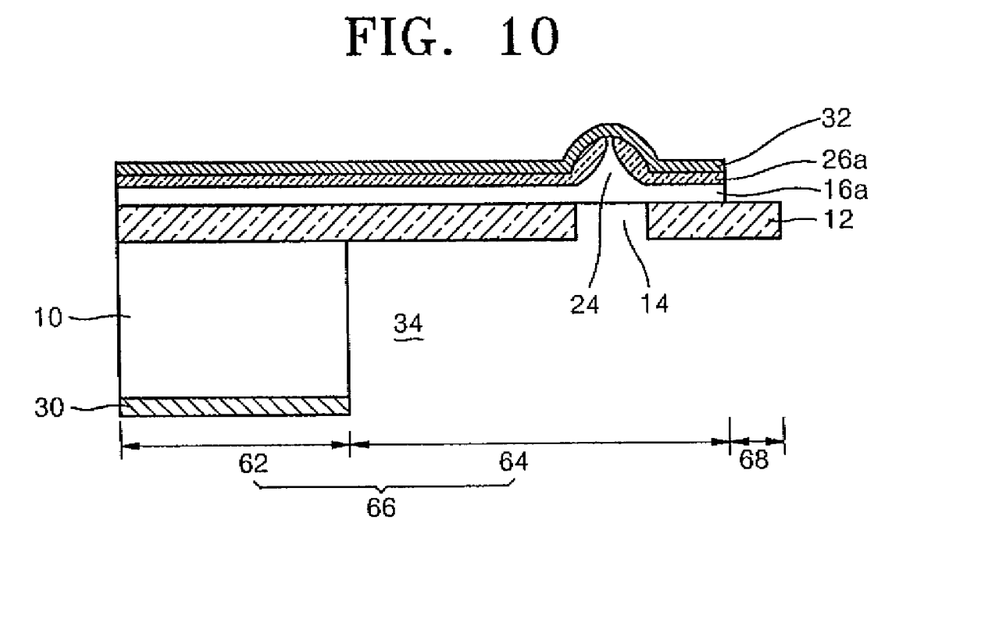

Referring to FIG. 10, the lower silicon layer 10 is etched using the etching mask layer pattern 30 as an etching mask to form a through hole 34 exposing the junction oxidation layer pattern 12 of the SOI substrate 18. The lower silicon layer 10 is etched only to the junction oxidation layer pattern 12.

Figure 11:
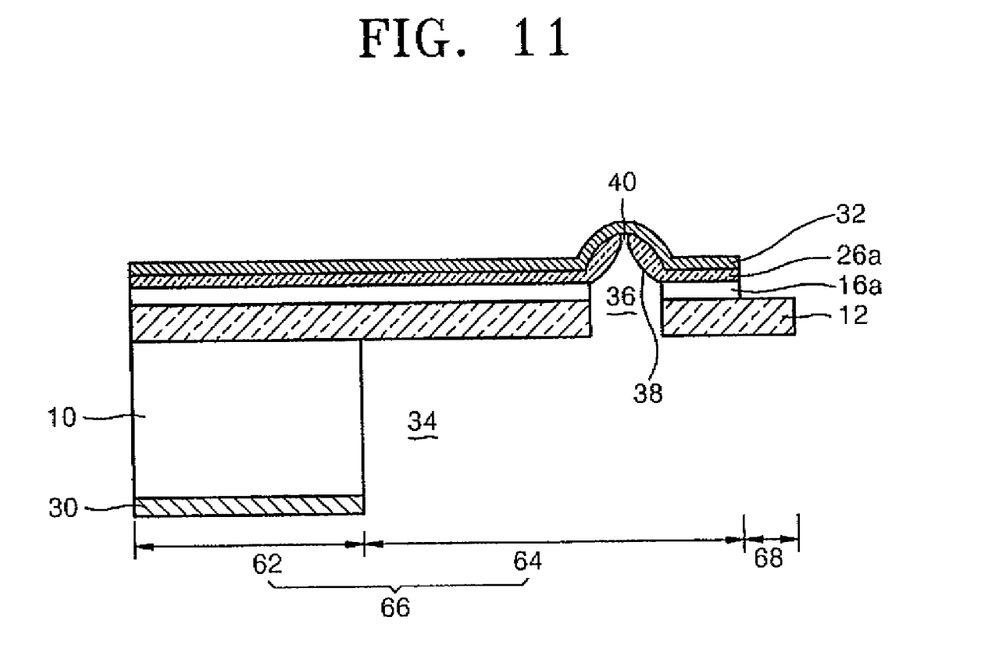

Referring to FIG. 11, a second hole 36 is formed by etching the upper silicon layer pattern 16a in the tip structure 24 on the first hole 14 using the junction oxidation layer pattern 12 using an etching mask. When the second hole 36 is formed, the upper silicon layer pattern 16a excluding the tip structure 24 is protected by the junction oxidation layer pattern 12. Then, a tip 38 having an aperture 40 formed in a conical form or in a parabolic form at a vertical end of the tip 38 is formed by etching the upper silicon layer pattern 16a in the tip structure 24. The aperture 40 is formed to protrude above the SOI substrate 18.

Figure 12:
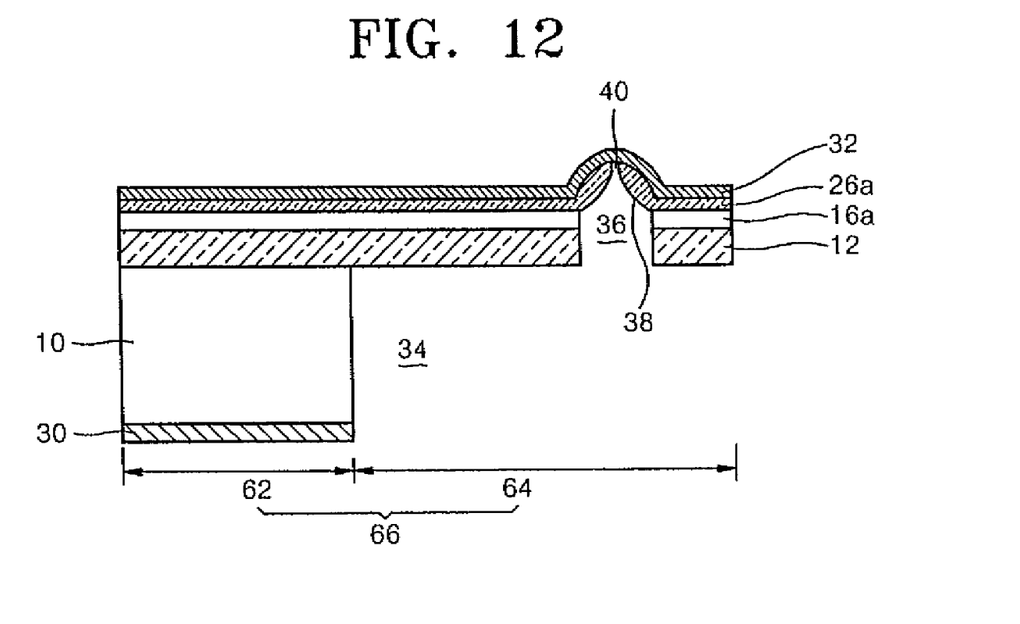

Referring to FIG. 12, the junction oxidation layer pattern 12 formed in the isolation portion 68 is removed. Thus, only the cantilever portion 66 formed of the cantilever arm support portion 62 and the cantilever arm 64 remains. In the cantilever arm 64, the junction oxidation layer pattern 12, the upper silicon layer pattern 16a, and the silicon oxidation layer pattern 26a forming a cantilever are formed.

Figure 13:
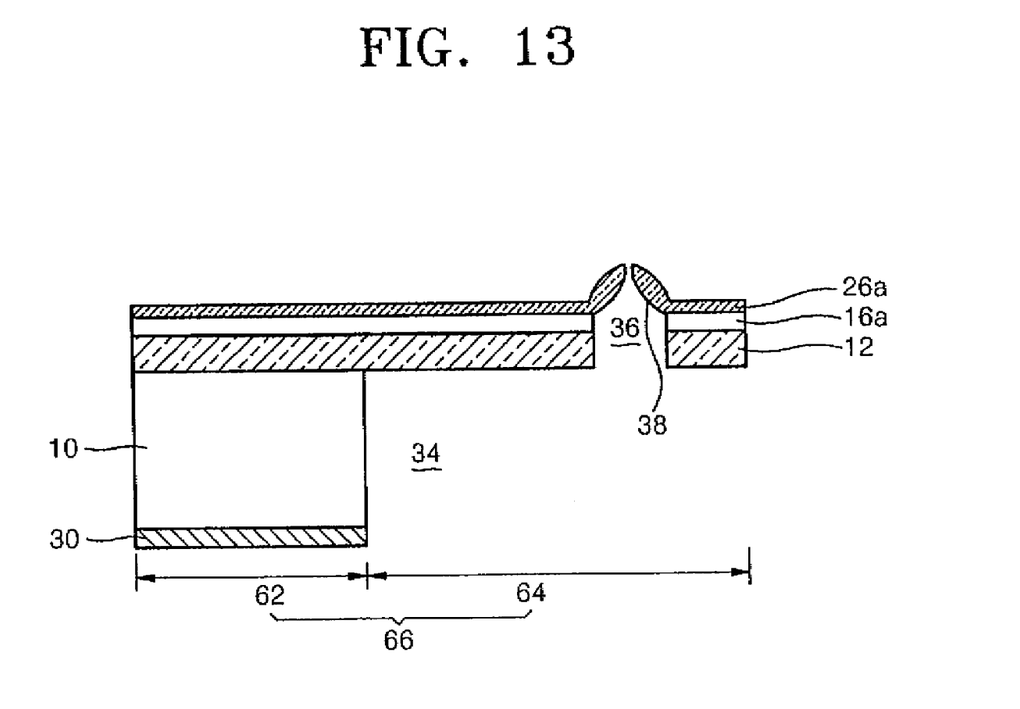

Referring to FIGS. 13 and 14, the pattern 32 for protecting the cantilever arm is removed. Next, an optical transmission prevention layer 42 for preventing optical transmission which does not cover the aperture 40 is formed on the silicon oxidation layer pattern 26a. The optical transmission prevention layer 42 is formed of a material preventing optical transmission such as a metal such as aluminum (Al) or gold (Au). Accordingly, a near-field optical probe 100 that includes the cantilever support portion 62 and the cantilever arm 64 is completed.

The cantilever arm 64 is formed of the junction oxidation layer pattern 12, the upper silicon layer pattern 16a, the silicon oxidation layer pattern 26a having a tip including an aperture 40, and the optical transmission prevention layer 42 formed on the silicon oxidation layer pattern 26a. As described above, in the present invention, a near-field optical probe can be manufactured by easily combining a manufacturing process of a tip including an aperture and a manufacturing process of a cantilever arm including the tip using an SOI substrate.

As described above, the near-field optical probe according to the present invention is manufactured based on the SOI substrate. Accordingly, the near-field optical probe includes a cantilever arm support portion including a lower silicon layer of the SOI substrate, and a cantilever arm using the junction oxidation layer pattern and the upper silicon layer pattern of the SOI substrate, the silicon oxidation layer pattern that is formed on the upper silicon layer pattern and includes a tip having an aperture, and the optical transmission prevention layer formed on the silicon oxidation layer pattern.

The near-field optical probe according to the present invention can prevent collision with a sample to be measured by the tip by forming the tip to protrude upward, that is, to extend up. In addition, the method of manufacturing the near-field optical probe can form a tip to protrude upward from the SOI substrate, that is, to extend up and easily combine a manufacturing process of a tip including an aperture and a manufacturing process of a cantilever arm including the tip.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A near-field optical probe comprising:
    a cantilever arm support portion formed of a lower silicon layer of a silicon-on-insulator (SOI) substrate, the cantilever arm support portion having a through hole formed therein at a side of the lower silicon layer; and
    a cantilever arm formed of a junction oxidation layer pattern and an upper silicon layer pattern on the SOI substrate that are supported on an upper surface of the lower silicon layer and each have a smaller hole than the through hole, a silicon oxidation layer pattern having a tip including an aperture at a vertical end corresponding with the smaller hole on the upper silicon layer pattern, and an optical transmission prevention layer that is formed on the silicon oxidation layer pattern and does not cover the aperture,
    wherein the smaller hole is formed through the junction oxidation layer pattern and the upper silicon layer pattern, and
    wherein the smaller hole exposes the junction oxidation pattern, the upper silicon layer pattern, and the tip including the aperture at the vertical end corresponding with the smaller hole on the upper silicon layer pattern.

2. The near-field optical probe of claim 1, wherein the tip is formed having a conical form or in a parabolic form.

3. The near-field optical probe of claim 1, wherein the aperture is protrudes upward from the SOI substrate.

* * * * *